United States Patent [19]

Watanabe

[11] Patent Number: 5,287,339
[45] Date of Patent: Feb. 15, 1994

[54] OPTICAL INFORMATION PROCESSING APPARATUS FOR HOLDING A LENS AT A PREDETERMINED POSITION ALONG A TRACKING PATH AT PULLING-IN OF FOCUSING CONTROL

[75] Inventor: Yoshihiko Watanabe, Yokohama, Japan

[73] Assignee: Canon Kabushiki Kaisha, Tokyo, Japan

[21] Appl. No.: 13,227

[22] Filed: Feb. 1, 1993

Related U.S. Application Data

[63] Continuation of Ser. No. 312,655, Feb. 21, 1989, abandoned.

[30] Foreign Application Priority Data

Feb. 23, 1988 [JP] Japan .................................. 63-038727

[51] Int. Cl.$^5$ .................................................. G11B 7/00
[52] U.S. Cl. ............................. 369/44.25; 369/44.29; 369/44.32
[58] Field of Search ............... 369/44.32, 44.14, 44.41, 369/112, 44.11, 44.35, 44.25, 44.28, 44.34, 32, 44.29, 44.27, 124, 120, 44.26, 44.33, 44.36; 250/201.5

[56] References Cited

U.S. PATENT DOCUMENTS

| | | | |
|---|---|---|---|
| 4,410,969 | 10/1983 | Maeda | 369/46 |
| 4,541,084 | 9/1985 | Oku et al. | 369/44.25 |
| 4,542,491 | 9/1985 | Takasago et al. | 369/45 |
| 4,641,020 | 3/1987 | Iwai | 369/44.14 |
| 4,740,679 | 4/1988 | Doi | 369/44.25 |
| 4,769,806 | 9/1988 | Takamori | 369/44.32 |
| 4,850,695 | 7/1989 | Mikuriya et al. | 369/44.41 |
| 4,982,393 | 1/1991 | Matsushita et al. | 369/44.32 |
| 4,982,394 | 1/1991 | Kanda et al. | 369/44.32 |
| 5,003,524 | 3/1991 | Ikeda | 369/44.28 |

*Primary Examiner*—Aristotelis Psitos
*Assistant Examiner*—Thang V. Tran
*Attorney, Agent, or Firm*—Fitzpatrick, Cella, Harper & Scinto

[57] ABSTRACT

An optical information processing apparatus for irradiating a focused light beam to an optical recording medium to record and/or reproduce information. The apparatus includes a device for focus-controlling the light beam, a focus pull-in device for switching the focus control device from an inactive state to an active state, a device for moving an irradiation position of the light beam in a surface of the medium to effect tracking control, and a device for holding the light beam at a center of a movable range by the tracking control device, during the focus pull-in.

17 Claims, 2 Drawing Sheets

OPTICAL INFORMATION PROCESSING APPARATUS FOR HOLDING A LENS AT A PREDETERMINED POSITION ALONG A TRACKING PATH AT PULLING-IN OF FOCUSING CONTROL

This applicaiton is a continuation of prior application Se.r No. 07/312,655, filed Feb. 21, 1989, now abandoned.

BACKGROUND OF THE INVENTION

1. Field of the Invention

The present invention relates to an optical information processing apparatus which irradiates a focused light beam to an optical recording medium to record and/or reproduce information.

2. Related Background Art

Various disk, card and tape media which record information by light and reproduce the recorded information have been known.

For example, in an optical information processing apparatus which uses an optical disk, the optical disk is scanned by a light beam which is modulated by recording information and focused to a fine spot, and information is recorded as optically detectable record pit tracks (information tracks). In order to exactly record the information without difficulty, such as crossing of the information tracks, it is necessary to control the irradiation position of the light spot on a plane of the optical disk in a direction perpendicular to the scan direction (auto-tracking, hereinafter referred to as AT). Further, in order to irradiate the light spot as a fine spot which is stable in spite of warp or mechanical tolerance of the optical disk, it is necessary to control the irradiation position normal to the plane of the optical disk (auto-focusing, hereinafter referred to as AF). In a reproduction mode, both AT and AF are necessary, too. Various techniques for AT and AF have been known. Usually, a focusing error signal and a tracking error signal are derived from differences between photo-sensing planes of focusing and tracking photo-detectors, and an objective lens is driven by AT and AF actuators.

In the above apparatus, when recording or reproduction is to be started, the focusing control means is switched from an inactive state to an active state, that is, so-called focus pull-in is effected. In the focus pull-in, a focus control loop is opened and a triangular wave signal is applied to a focus actuator to move the objective lens up and down, as described in U.S. Pat. No. 4,542,491. When the objective lens reaches a position corresponding to a linear region of a focus error signal, the loop is closed. During the focus pull-in, the tracking control loop is kept open.

In the above method, since no drive force along the tracking path is applied to the objective lens in the focus pull-in, the objective lens may deviate from an intended mechanical center (a center of a movable range by the tracking actuator, at which an optical axis of the light beam and an optical axis of the objective lens coincide). Such a deviation may be caused by a residual strain of a spring which movably supports the objective lens or by an offset of an input circuit to the tracking actuator. If such a deviation occurs, the operation range may be unbalanced when the tracking actuator is activated after the focus pull-in. For example, assuming that the optical system of the apparatus assures an optical output in a range of ±250 μm from the optical center and that there occurs a deviation of +100 μm, the assurance of the optical output is in a range of −350 μm to +100 μm. Accordingly, if the light spot is track-jumped in a positive direction by 100 tracks (1.6 μm/track) after the focus pull-in, the light beam is out of the range of assurance of the optical output.

SUMMARY OF THE INVENTION

It is an object of the present invention to provide an optical information processing apparatus which solves the above problems and prevents the deviation of the light beam along the tracking path from occurring in the focus pull-in.

The above object of the present invention is achieved by an optical information processing apparatus for irradiating a focused light beam to an optical recording medium to record and/or reproduce information, comprising:

means for focus-controlling the ilght beam;

focus pull-in means for switching said focus control means from an inactive state to an active state:

means for moving an irradiation position of the light beam in a surface of the medium to effect tracking control; and means for holding the light beam at a center of a movable range by said tracking control means, during the focus pull-in.

DETAILED DESCRIPTION OF THE PREFERRED EMBODIMENTS

Figure 1:
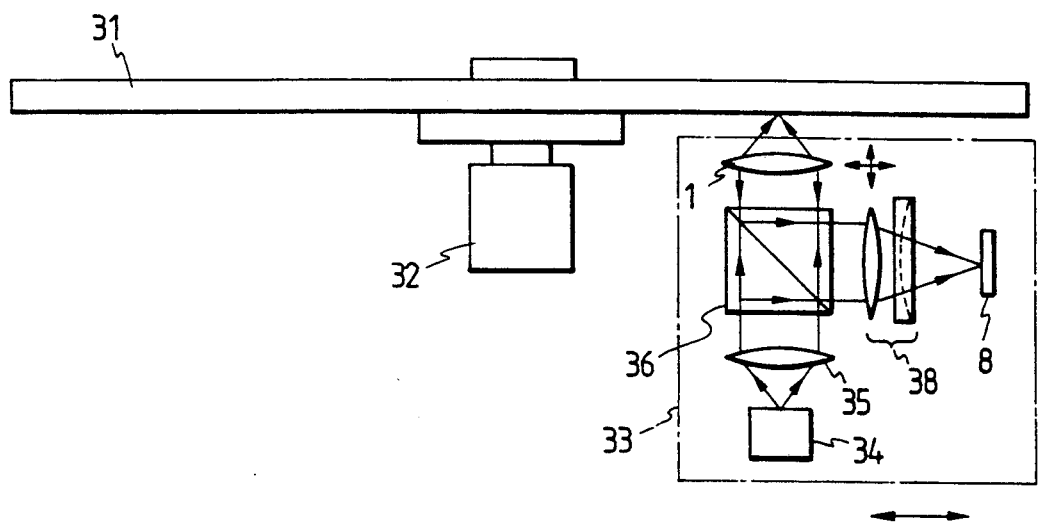
FIG. 1 shows a schematic view of one embodiment of the present invention applied to an optical disk apparatus.

FIG. 1 shows an embodiment of the present invention applied to an optical disk apparatus. An optical disk 31 is rotated by a spindle motor 32. An optical head 33 for recording and reproducing information on and from the optical disk 31 is moved radially of the disk by drive means (not shown).

A semiconductor laser 34 is provided in the optical head 33. A light beam emitted from the semiconductor laser 34 passes through a collimater lens 35 and a beam splitter 36 and is focused onto the optical disk 31 by an objective lens 1. The light reflected by the optical disk 31 passes through the objective lens 1 and is reflected by a beam splitter 36. The reflected beam is focused by a sensor lens 38 which comprises a rotating symmetrical lens and a cylindrical lens, and is detected by a four-element detector 8, which detects a focusing error signal and a tracking error signal by using an astigmatism method and a push-pull method, and supplies those signals to an actuator, which in turn drives the objective lens along the optical axis and the tracking path which is perpendicular to the optical axis, in accordance with those signals to effect the AF and AT controls.

Figure 2:
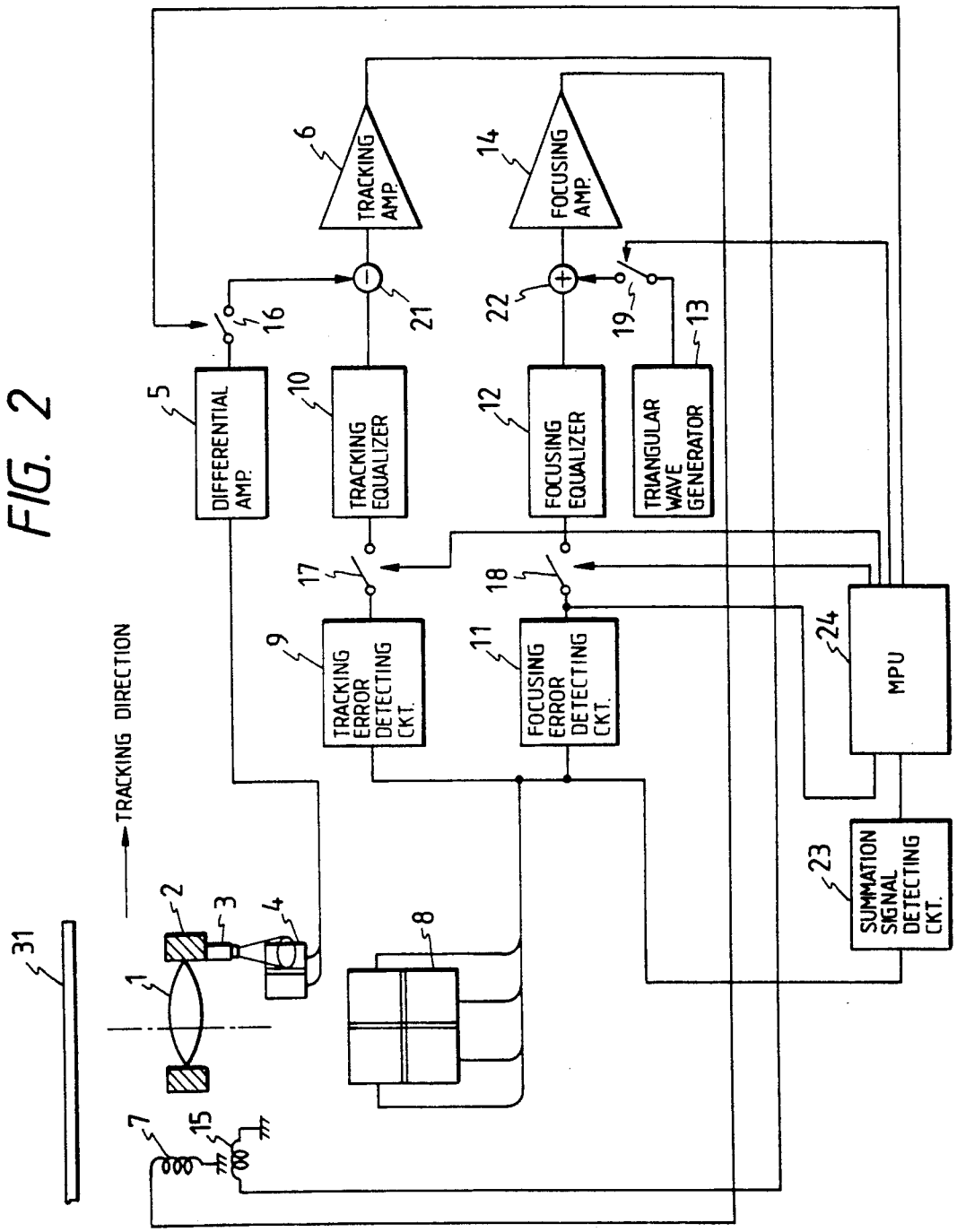
FIG. 2 shows a block diagram of a control circuit of the apparatus of FIG. 1, and FIGS. 3A to 3D show signal waveforms in the circuits of FIG. 2.

FIG. 2 shows a block diagram of an AT/AF control circuit of the apparatus of FIG. 1.

The objective lens 1 is fixed to a bodytube 2 on which a light emitting diode (LED) 3 is mounted. A two-element detector 4 is arranged on a line of light irradiated from the LED 3. When the objective lens 1 moves in the tracking direction, the light irradiated from the LED 3 is moved on the two-element detector 4 by the same distance. Outputs of the two-element detector 4 are supplied to a differential amplifier 5.

The four-element detector 8 detects the light reflected by the optical disk 31. Outputs of the respective photo-sensing elements of the four-element detector 8 are supplied to a tracking error detecting circuit 9 and a focusing error detecting circuit 11, which detect a tracking error signal and a focusing error signal, respectively. Those error detecting circuits may be constructed as shown in U.S. Pat. No. 4,410,969. The outputs of the tracking error detecting circuit 9 and the focusing error detecting circuit 11 are supplied to a tracking equalizer 10 and a focusing equalizer 12 through a switch (SW) 17 and a switch (SW) 18, respectively. The output of the tracking equalizer 10 and the output of the differential amplifier 5 through the SW 16 are supplied to a subtractor 21, whose output is amplified by a tracking amplifier 6, whose output is supplied to a tracking actuator 15. On the other hand, the output of the focusing equalizer 12 and an output of a triangular wave generator 13 through the SW 19 are supplied to an adder 22, whose output is amplified by a focusing amplifier 14, whose output is applied to a focusing actuator 7.

On the other hand, the outputs of the respective photo-sensing elements of the four-element detector 8 are added by a summation signal detecting circuit 23, whose output is supplied to a microprocessor unit (MPU) 24. The MPU 24 generates a focus pull-in timing signal based on the focusing error signal to control the switching of SW 16–SW 19.

The operation of the optical disk apparatus is now explained.

In the focus pull-in, the MPU 24 first opens the SW 17 and the SW 18 to deactivate the focusing servo and the tracking servo. Under this condition, the SW 16 is closed. Thus, the tracking amplifier 6, the tracking actuator 15, the LED 3, the two-element detector 4 and the differential amplifier 5 constitute a servo loop so that the objective lens 1 is positioned to and held at the mechanical center (optical adjustment point) which is the center of movable range in the tracking direction. Under this condition, the SW 19 is closed so that the output of the triangular wave generator 13 is applied to the focusing actuator 7 through the focusing amplifier 14 and the objective lens 1 is moved up and down to effect focus searching. At an in-focus position, the MPU 24 opens the SW 19 and closes the SW 18 to terminate the focus pull-in. At this moment, the objective lens is held at the mechanical center and no deviation occurs. Then, the MPU 24 opens the SW 16 and closes the SW 17, and activates the tracking servo at the mechanical center.

Figure 3A:
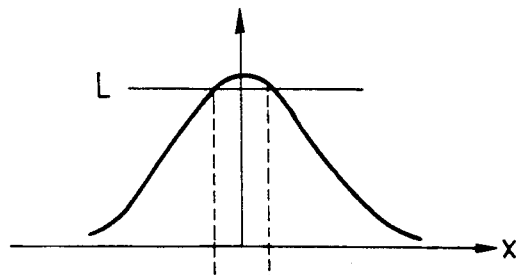
Figure 3B:
Figure 3C:
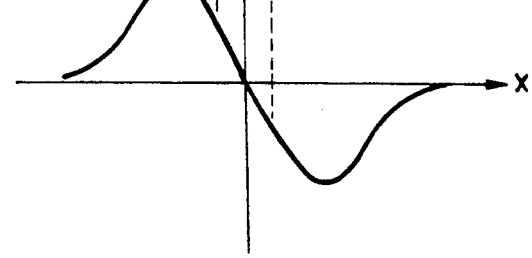
Figure 3D:
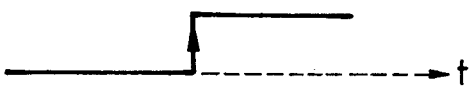

The focus pull-in timing signal is generated by the MPU 24 in the following manner. When the objective lens is moved parallel to the optical axis by a pattern signal generated by the triangular wave generator 13, the summation signal detecting circuit 23 supplies a signal shown in FIG. 3A to the MPU 24. On the other hand, the focusing error detecting circuit 11 supplies a focusing error signal shown in FIG. 3C to the MPU 24. The MPU 24 slices the signal of FIG. 3A at a level L to generate a window pulse shown in FIG. 3B. During a high level period of the signal of FIG. 3B, a zero-crossing point of the signal of FIG. 3C is detected to generate a timing signal shown in FIG. 3D. The timing signal is supplied to the SW 18 and the SW 19 from the MPU 24 so that the SW 19 is opened and the SW 18 is closed.

In accordance with the optical information processing apparatus of the present invention, the focus pull-in is effected while the optical system for irradiating the light beam to the optical recording medium is kept at the predetermined position. Thus, the light beam may be track-jumped to a maximum point in the range of optical assurance even immediately after the focus pull-in.

Various modifications of the present invention may be made in addition to the embodiment described above. For example, the optical recording medium is not limited to a disk, but it may be a tape, card or any other shape. The present invention covers all of those modifications without departing from the scope of the following claims.

What is claimed is:

1. An optical information processing apparatus for irradiating a focused light beam to an optical recording medium to record and/or reproduce information, said apparatus comprising:
    a light source for emitting a light beam;
    a lens for focusing the light beam emitted from said light source to irradiate the recording medium;
    detecting means for detecting light from the recording medium when irradiated by the light beam and for generating a focusing error signal and a tracking error signal;
    focus control means for receiving the focusing error signal and for moving said lens along an optical axis to control focus of the light beam relative to the recording medium;
    focus pull-in means for generating a focus control signal and for moving said lens along the optical axis to effect focus pull-in of the light beam relative to the recording medium in accordance with the focus control signal;
    tracking control means for receiving the tracking error signal and for moving said lens in a direction perpendicular to the optical axis to control tracking of the light beam relative to the recoridng medium;
    hold means for determining a center of a movable range of said lens and for causing said tracking control means to hold the light beam at the center of the movable range; and
    active state control means for generating an active state control signal, and for selectively effecting one of operation and non-operation of said focus control means, focus pull-in means, tracking control means and hold means in accordance with the active state control signal, wherein said active state control means effects the non-operation of said focus control means and tracking control means and the operation of said hold means upon operation of said focus pull-in means.

2. An optical information processing apparatus according to claim 1, wherein said focus control means comprises drive means for driving said lens along the optical axis in accordance with the focusing error signal.

3. An optical information processing apparatus according to claim 1, wherein the focus control signal comprises a triangular wave signal.

4. An optical information processing apparatus according to claim 1, wherein said tracking control means comprises drive means for driving said lens in a tracking direction perpendicular to the optical axis in accordance with the tracking error signal.

5. An optical information processing apparatus according to claim 1, wherein said hold means comprises position detection means for detecting the position of said lens in the tracking direction.

6. An optical information processing apparatus according to claim 5, wherein said position detection means comprises a light emitting element movable in the tracking direction with said lens, a detector for detecting light emitted from said light emitting element, said detector having a photosensing surface thereof divided into two areas in the tracking direction, and a differential amplifier for differentiating respective outputs of the divided areas of said detector.

7. An optical information processing apparatus comprising:
a light source for emitting a light beam;
a lens for focusing the light beam emitted from said light source to irradiate an optical recording medium;
a focusing actuator for moving said lens along an optical axis;
a focusing error signal generating circuit for detecting a focusing error of the optical beam by detecting light reflected from the recording medium when irradiated by the light beam, and for generating a focusing error signal;
a pattern signal generating circuit for generating a signal having a predetermined pattern for driving said focusing actuator to effect focus pull-in of the light beam;
a first switch arrangement for selectively supplying the output of said focusing error signal generating circuit and the output of said pattern signal generating circuit to said focusing actuator;
a tracking actuator for moving said lens in a tracking direction perpendicular to the optical axis;
a tracking error signal generating circuit for detecting a tracking error of the optical beam by detecting light reflected from the recording medium when irradiated by the light beam, and for generating a tracking error signal;
a hold signal generating circuit for generating a signal to hold said lens at a predetermined position in the tracking direction;
a second switch arrangement for selectively supplying the output of said tracking error signal generating circuit and the outuput of said hold signal generating circuit to said tracking actuator; and
a control circuit for controlling said first switch arrangement and said second switch arrangement to supply the hold signal to said tracking actuator when the pattern signal is supplied to said focusing actuator.

8. An optical information processing apparatus according to claim 7, wherein said hold signal generating circuit comprises a light emitting element movable in the tracking direction with said lens, a detector for detecting light emitted from said light emitting element, said detector having a photosensing surface thereof divided into two areas along the tracking direction, and a differential amplifier for differentiating respective outputs of the divided areas of said detector.

9. An optical information processing apparatus according to claim 7, wherein said pattern signal generating circuit comprises a triangular wave generator.

10. An optical information processing apapratus for irradiating a focused light beam to an optical recording medium to record and/or reproduce information, said apparatus comprising:
a light source for emitting a light beam;
a lens for focusing the light beam emitted from said light source to irradiate the recording medium;
detecting means for detecting light from the recording medium when irradiated by the light beam and for generating a focusing error signal and a tracking error signal;
focus control means for receiving the focusing error signal and for moving said lens along an optical axis to control focus of the light beam relative to the recording medium;
focus pull-in means for generating a focus control signal and for moving said lens along the optical axis to effect focus pull-in of the light beam relative to the recording medium in accordance with the focus control signal;
tracking control means for receiving the tracking error signal and for movign said lens in a direction perpendicular to the optical axis to control tracking of the light beam relative to the recording medium;
hold means for determining a predetermined position of a movable range of said lens and for causing said tracking control means to hold the light beam at the predetermined position of the movable range; and
active state control means for generating an active state control signal, and for selectively effecting one of operation and non-operation of said focus control means, focus pull-in means, tracking control means and hold means in accordance with the active state control signal, wherein said active state control means effects the non-operation of said focus control means and tracking control means and the operation of said hold means upon operation of said focus pull-in means.

11. An optical information processing apparatus according to claim 10, wherein said focus control means comprises drive means for driving said lens along the optical axis in accordance with the focusing error signal.

12. An optical information processing apparatus according to claim 10, wherein the focus control signal comprises a triangular wave signal.

13. An optical information processing apparatus according to claim 10, wherein said tracking control means comprises drive means for driving said lens in a tracking directino perpendicular to the optical axis in accordance with the tracking error signal.

14. An optical information processing apparatus according to claim 10, wherein said hold means comprises position detection means for detecting the position of said lens in the tracking direction.

15. An optical information processing apparatus according to claim 14, wherein said position detection means comprises a light emitting element movable in the tracking direction with said lens, a detector for detecting light emitted from said light emitting element, said detector having a photosensing surface thereof divided into two areas in the tracking direction, and a differential amplifier for differentiating respective outputs of the divided areas of said detector.

16. An optical information processing method of irradiating a light spot onto an information recording medium having a plurality of tracks to record and/or reproduce information, said method comprising the steps of:

irradiating a light beam emitted from a light source through an optical system to the recording medium as a light spot;

effecting focus pull-in of the light spot by adjusting a position of the opticla system to focus the light spot on the recording medium;

holding the light spot at a predteermined position within a movable range of the optical system;

adjusting the position of the optical systme to effect focusing of the light spot after being pulled-in said pull-in step;

adjusting the position of the optical system to effect tracking of the light spot relative to a track on the recording medium; and selectively effecting said pull-in, holding, focusing adjusting and tracking adjusting steps, wherein in said selective effecting step, said focusing adjusting and tracking adjusting steps are not effected and said holding step is effected upon effecting said pull-in step.

17. An opticla information processing apparatus for irradiating a light beam onto an information recording medium having a plurality of tracks to record and/or reproduce information, said apparatus comprising:

a light source for emitting a light beam;

an optical system for focusing the light beam emitted from said light source to irradiate the recording medium;

an actuator for moving said optical system;

detecting means for detecting light from the recording medium when irradiated by the light beam and for generating a focusing error signal and a tracking error signal;

focus pull-in means for generating a focus control signal and for driving said actuator to effect focus pull-in of the light beam relative to the recording medium in accordance with the focus control signal;

focusing state adjustment means for receiving the focusing error signal and for controlling said actuator to hold the light beam in-focus after said focus pull-in means effects focus pull-in of the light beam;

tracking state adjustment means for receiving the tracking error signal and for causing said actuator to track the light beam relative to a track on the recording medium;

hold means for determining a predetermined position within a movable range of said actuator and for causing said actuator to hold the light beam at the predetermined position within the movable range; and active state control means for generating an active state control signal, and for selectively effecting one of operation and non-operation of said focus pull-in means, focusing state adjustment means, tracking state adjustment means and hold means in accordance with the active state control signal, wherein said active state control means effects the non-operation of said focusing state adjustment means and tracking state adjustment means and the operation of said hold means upon operation of said focus pull-in means.

* * * * *

UNITED STATES PATENT AND TRADEMARK OFFICE
CERTIFICATE OF CORRECTION

PATENT NO. : 5,287,339        Page 1 of 2
DATED : February 15, 1994
INVENTOR(S) : YOSHIHIKO WATANABE ET AL.

It is certified that error appears in the above-indentified patent and that said Letters Patent is hereby corrected as shown below:

COLUMN 1:

Line 7, "applicaiton" should read --application--; and
    Line 8, "Se.r No." should read --Ser. No.--.

COLUMN 2:

Line 20, "ilght" should read --light--; and
    Line 22, "state:" should read --state;--.

COLUMN 5:

Line 49, "outupt" should read --output--.

COLUMN 6:

Line 1, "apapratus" should read --apparatus--;
    Line 22, "movign" should read --moving--;
    Line 51, "directino" should read --direction-;

UNITED STATES PATENT AND TRADEMARK OFFICE
CERTIFICATE OF CORRECTION

PATENT NO. : 5,287,339         Page 2 of 2
DATED      : February 15, 1994
INVENTOR(S) : YOSHIHIKO WATANABE ET AL.

It is certified that error appears in the above-indentified patent and that said Letters Patent is hereby corrected as shown below:

COLUMN 7:

Line 7, "opticla" should read --optical--;
    Line 9, "predteermined" should read --predetermined--;
    Line 11, "systme" should read --system--;
    Line 12, "said" should read --in said--; and
    Line 23, "opticla" should read --optical--.

Signed and Sealed this

Sixteenth Day of August, 1994

Attest:

BRUCE LEHMAN

Attesting Officer        Commissioner of Patents and Trademarks